March 31, 1953 J. H. MATHERS 2,633,034
POWER TRANSMISSION APPARATUS
Filed July 5, 1949 9 Sheets-Sheet 1

Inventor
John H. Mathers
By Young, Emery & Thompson
Attorneys

March 31, 1953

J. H. MATHERS 2,633,034

POWER TRANSMISSION APPARATUS

Filed July 5, 1949

Inventor
John H. Mathers
By Young, Emery & Thompson
Attorneys

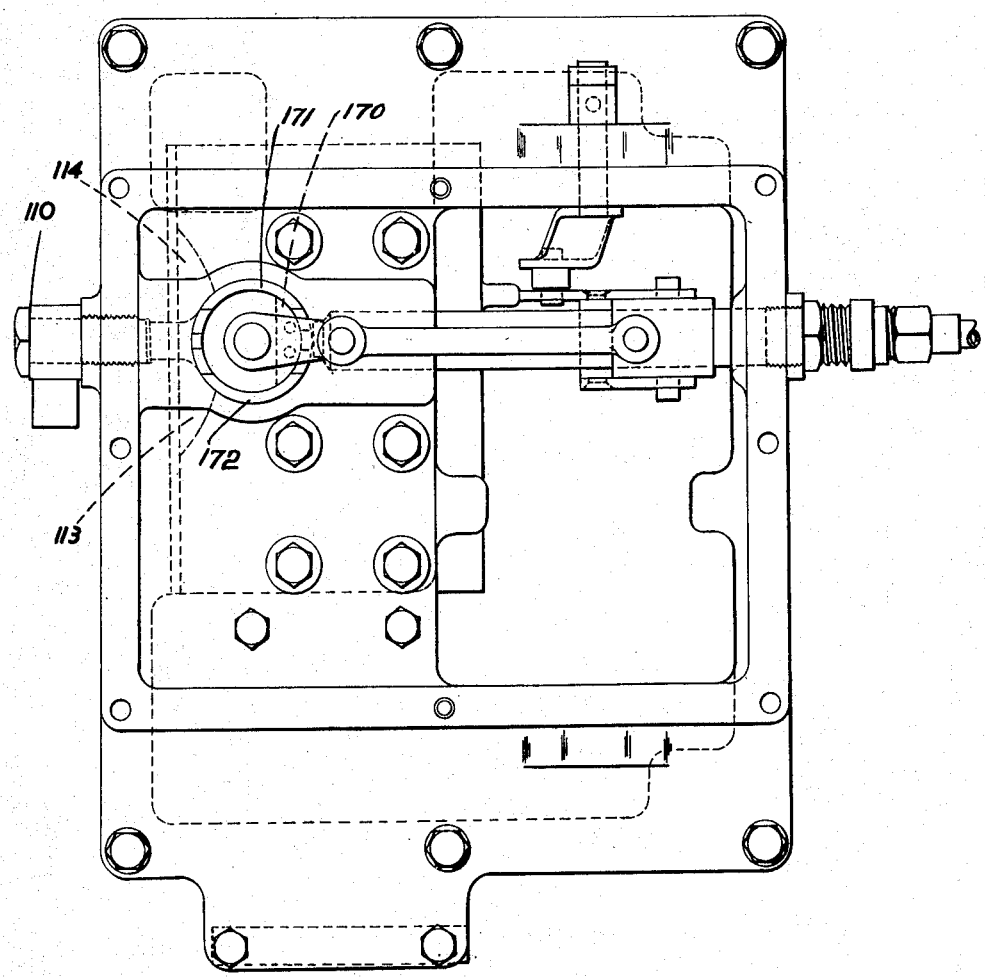

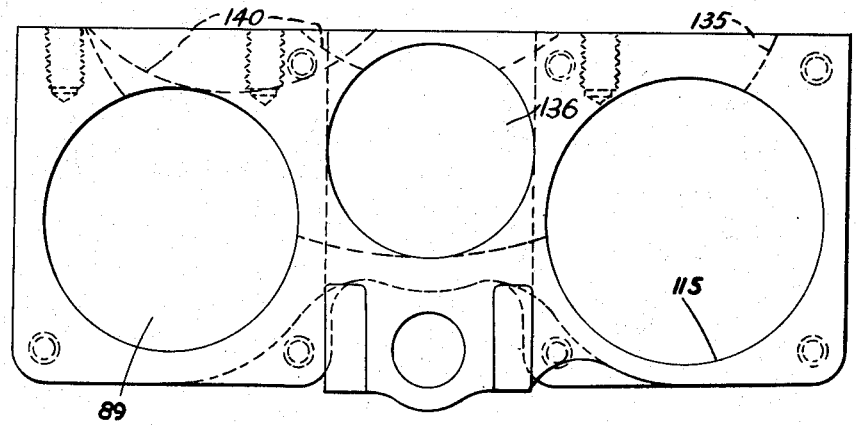
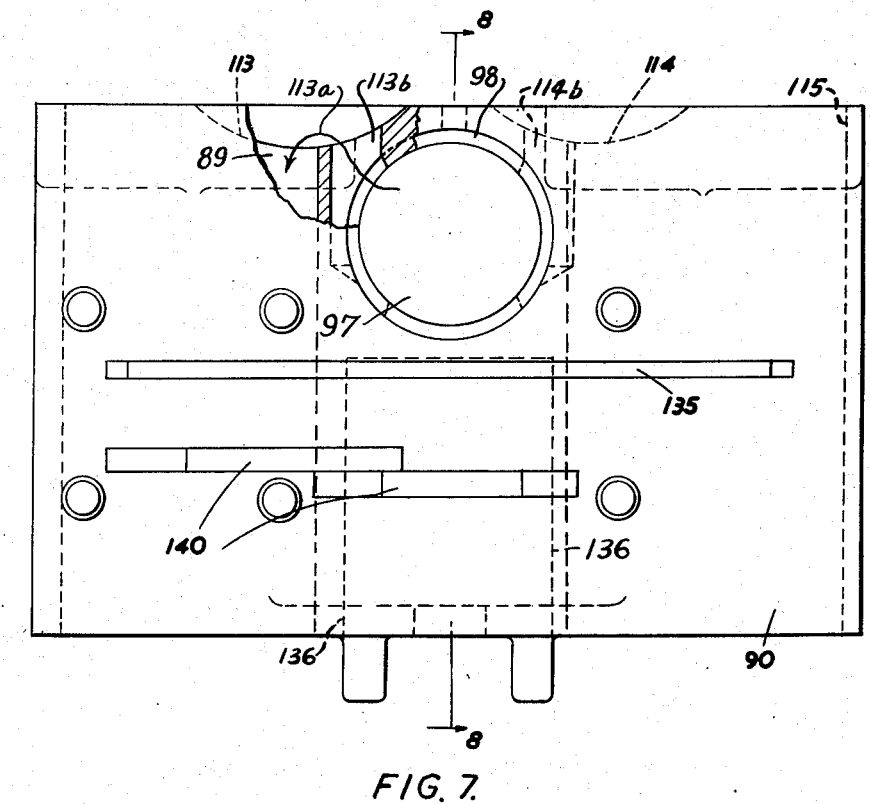

March 31, 1953 J. H. MATHERS 2,633,034
POWER TRANSMISSION APPARATUS
Filed July 5, 1949 9 Sheets-Sheet 6

Inventor
JOHN H. MATHERS
By Young, Emery & Thompson
Attorneys

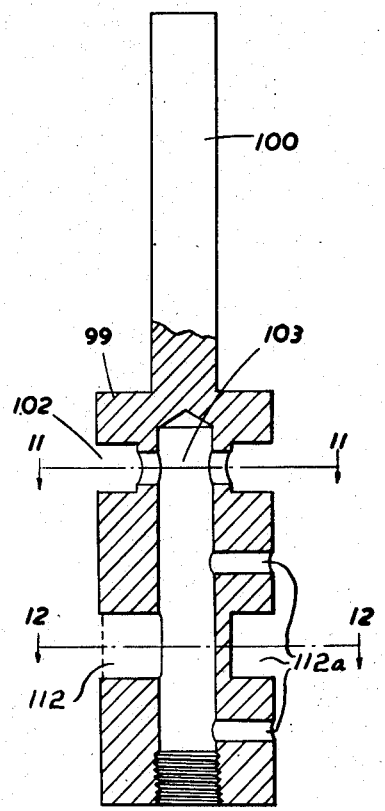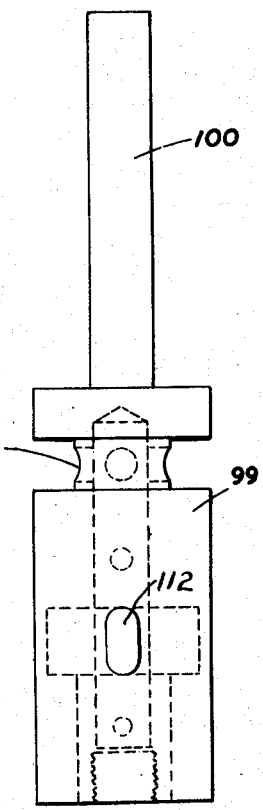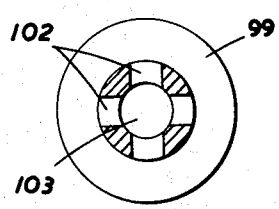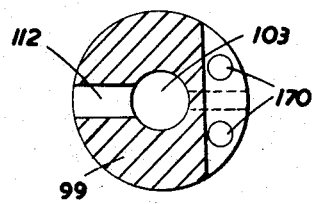

March 31, 1953  J. H. MATHERS  2,633,034
POWER TRANSMISSION APPARATUS
Filed July 5, 1949  9 Sheets-Sheet 8

Inventor
JOHN H. MATHERS
By Young, Emery & Thompson
Attorneys

Patented Mar. 31, 1953

2,633,034

UNITED STATES PATENT OFFICE 2,633,034

POWER TRANSMISSION APPARATUS

John Herbert Mathers, Hamble, near Southampton, England

Application July 5, 1949, Serial No. 102,978
In Great Britain July 5, 1948

14 Claims. (Cl. 74—472)

This invention relates to power transmission apparatus and is more particularly concerned with gearing for marine applications in which ahead, astern, and neutral conditions are required.

Such apparatus has been proposed in which friction devices such as clutches or brakes are engaged for bringing the appropriate gearing into action, and means are provided for operating the throttle. It is an important object of the present invention to provide means whereby the appropriate friction device is brought fully into operation before the throttle is allowed to open or at any rate before the throttle is allowed to be fully opened as otherwise considerable wear will occur on the friction surfaces of the clutches and brakes.

According to one aspect of the invention fluid under pressure is directed by a control valve to a movable friction device control member which is actuated to effect engagement of said device and the position of the said member controls entry of fluid under pressure to a chamber where it operates a throttle control member. The same fluid which actuates said friction device control member may be redirected for actuating the throttle control member.

A further object of the invention is to provide means for supplying lubricant efficiently to the gears when these are in use and for this purpose the position of one or both said members may control flow of lubricant to the gears. Preferably the lubricant comprises the same fluid as is used to operate said member or members and is allowed to escape through a suitable port whence it is directed to the gears, said port being uncovered by one or both said members when they are moved to their operative positions.

A constructional form of the invention will now be described with reference to the accompanying diagrammatic drawings wherein:

Figure 5 is a top plan view of part of the hydraulic control device of Figure 1 with part of the outer casing thereof removed;

Figure 6 is an end elevation of the cylinder block looking from the right of Figure 1;

Figure 7 is a top plan view of the cylinder block of Figure 1;

Figure 10 is a detail section of a rotary valve;

Figure 14:
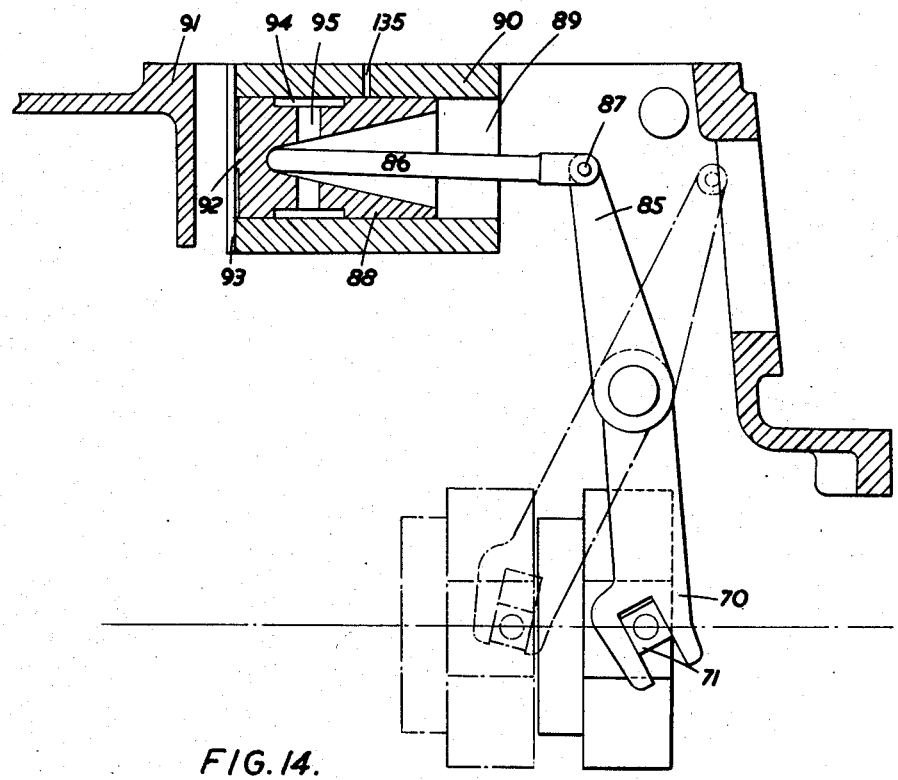
Figure 15:
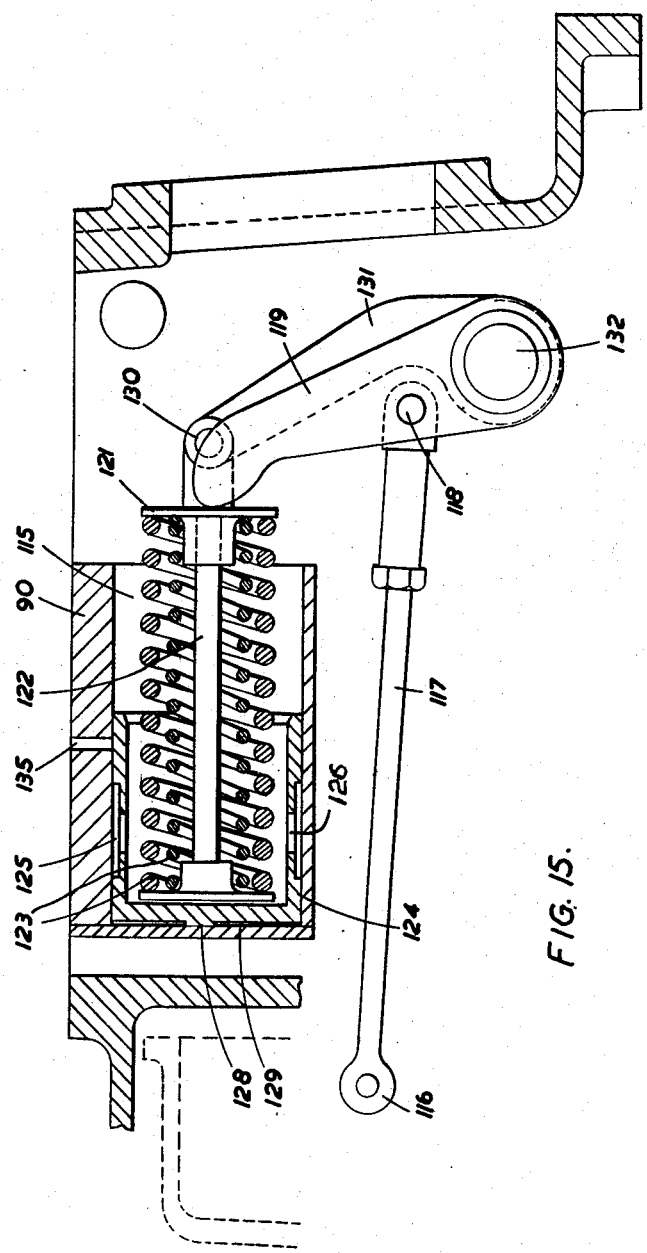

Figures 11 and 12 are sections on the lines 11—11 and 12—12 of Figure 10;

Figure 13 is an elevation of the valve of Figure 10;

Figures 14 and 15 show details of the hydraulic operating means for a clutch and brake.

The gearing has a driven plate 20 connected by resilient couplings 21 to the output member 22 of an engine. The plate 20 is connected by bolts 24 and dowel pins to a collar 25 which has a flange 26 provided with a drum 27 formed with teeth 28 which carry two friction clutch plates 29, 30. The friction plates 29, 30 have teeth 31, 32 which engage the teeth 28 slidably. Friction plates 35, 36 have teeth 37, 38 which slidably engage splines 39 on a drum 40 carried by side plates 41, 42 which are mounted on appropriate bearings. The drum 40 also has splines 44 slidably engaged by teeth 45 on friction plates 46 which can engage other friction plates 47 provided with teeth 48 which slidably engage splines 49 on a flange 50 carried by a collar 51 which is splined at 52 on to the output shaft 53.

Figure 1:
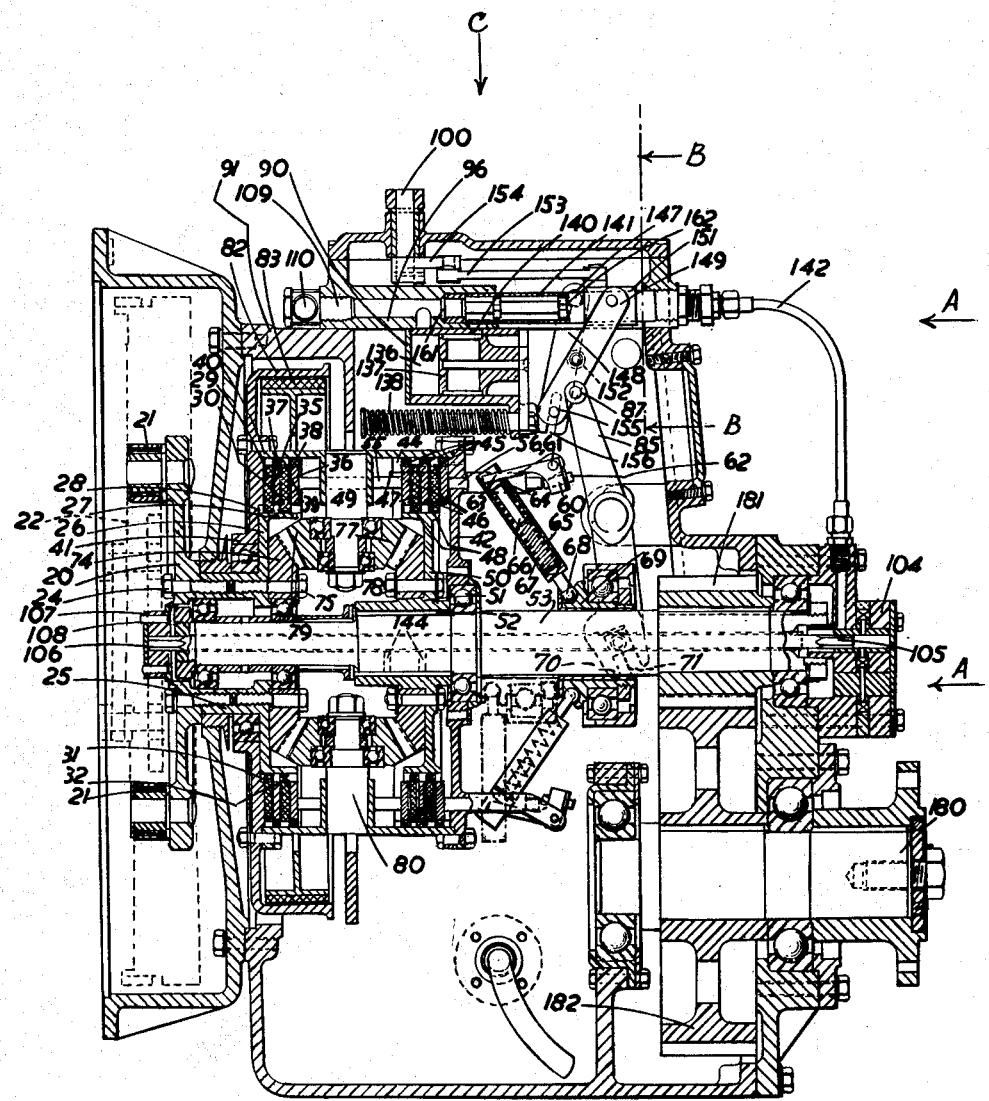
Figure 1 is a vertical sectional view of an apparatus embodying the invention.

The drum 40 carries pins 55 slidably disposed between the two sets of clutch plates. The plate 42 carries a number of pins 56 slidably so that when these pins are pressed to the left in Figure 1 they press the right-hand set of friction plates together and this pressure is transmitted through the plates and the pins 55 to the left-hand set of plates so that the clutch plates engage simultaneously whereby power is transmitted through the input members through the drum 40 to the output shaft 53 forming a direct drive for "ahead." The pins 56 are moved for engaging the clutch by a set of devices which are constructed as follows:

A lever 60 is pivoted at 61 and carries an adjustable screw 62 which contacts the pin 56. The end 63 of the lever 60 projects through a slot 64 in the end of a tubular member or sine bar 65 and is contacted by a pin 66 pressed by a spring 67. The other end of the sine bar has a ball end 68. All the ball ends 68 are pivotally connected on a collar 69 adapted to be moved along the shaft 53 by means of a fork 70 and pivoted block 71 that is carried by the collar. As the collar is moved along the shaft towards the left in Figure 1, the sine bar moves towards its vertical dead centre position and the lower part of Figure 1 shows a sine bar in this position for illustrative purposes although it will be understood that all the sine bars have the same angle at any instant.

The gearing for reverse drive consists of a bevel wheel 74 fixed by bolts 75 to the collar 25 and a similar bevel wheel 77 attached by bolts 78 to the collar 51. These bevel wheels are engaged by a set of pinions 79 carried by spindles 80 which in turn are carried by the drum 40. The plate 41 carries a brake drum 82 containing expanding brake shoe elements 83. With the clutch plates disconnected and the brake drum stationary the output shaft will be driven in reverse.

The neutral condition exists when both clutches and brake are disconnected.

Figure 4:
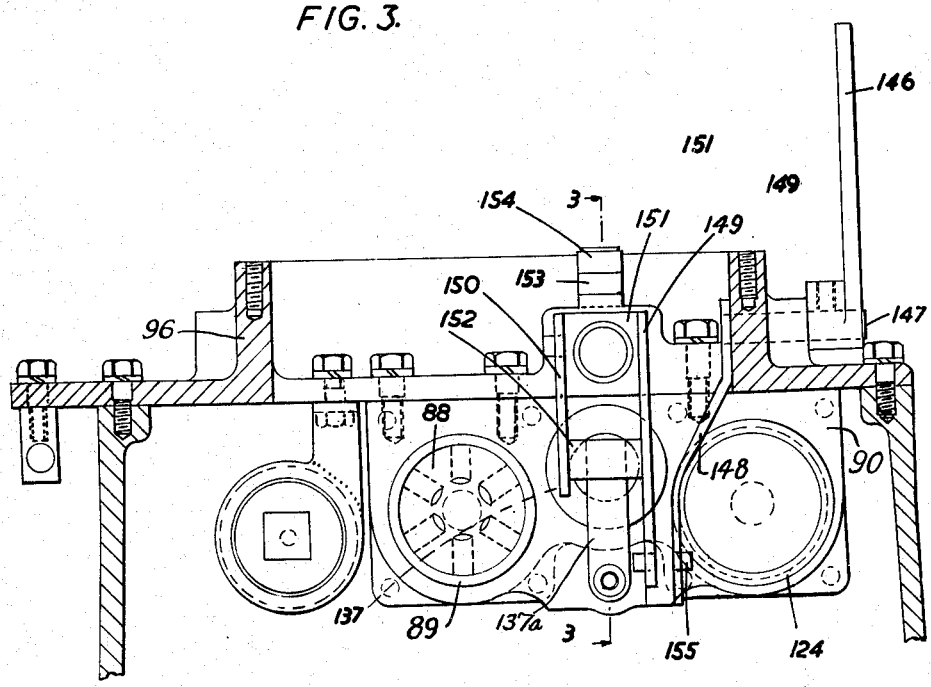
Figure 4 is a end view, in the direction of the arrows B in Figure 1, of the cylinder block and associated elements forming part of the hydraulic control device shown in Figure 1.
Figure 8:
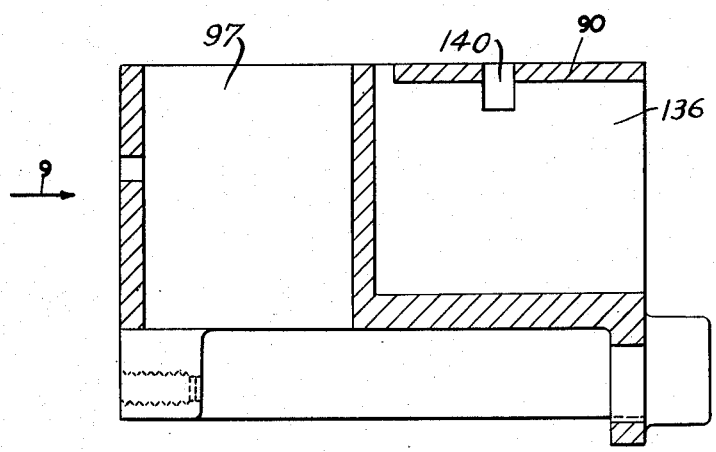
Figure 8 is a vertical section on the line 8—8 of Figure 7.
Figure 9:
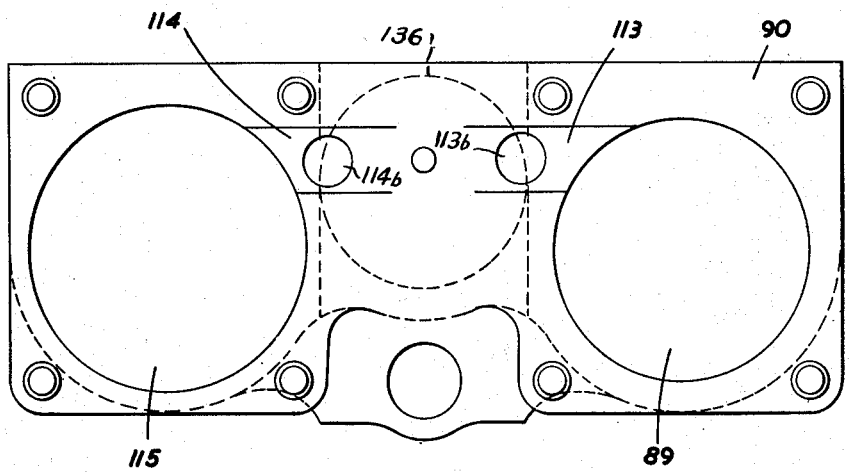
Figure 9 is an end elevation of the cylinder block in the direction of the arrow 9 in Figure 8 or from the left of Figure 1.

For operating the collar 69 the fork 70 is carried by a lever 85 the upper end of which is pivotally attached to a piston rod 86 (in Figure 14) at 87. The piston rod 86 carries a piston 88 (see also Figures 4, 6 and 9) disposed in a cylinder 89 which is in turn disposed in a cylinder block 90 carried by a casting 96 which is bolted on to the top of a main housing 91. The piston 88 has a projection 92 in order to leave a space 93 for oil introduced into the cylinder under pressure. The piston 88 has a recess 94 connected by ports 95 to the interior of the piston for a purpose presently to be described.

Figure 2:
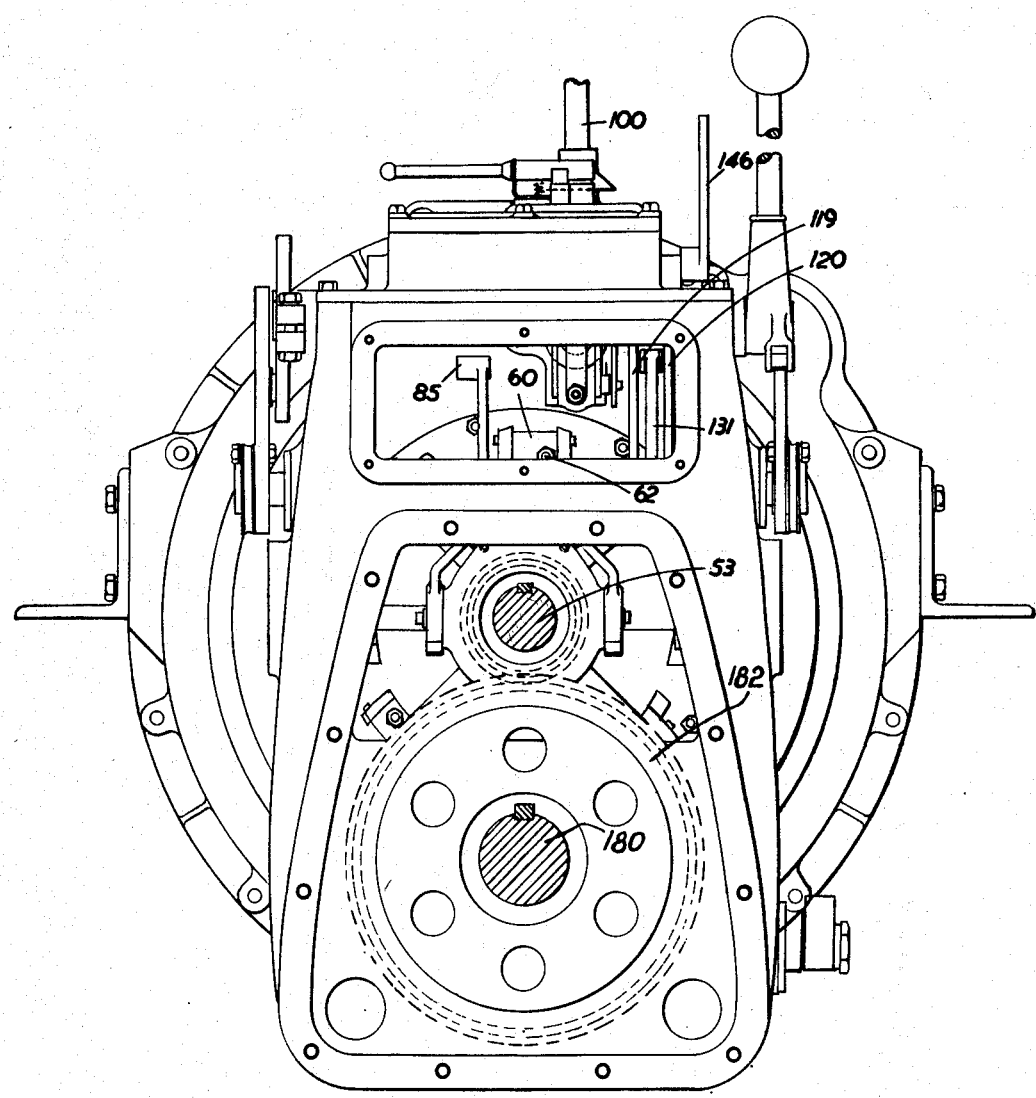
Figure 2 is an end elevational view of the apparatus of Figure 1 in the direction of the arrows A.
Figure 3:
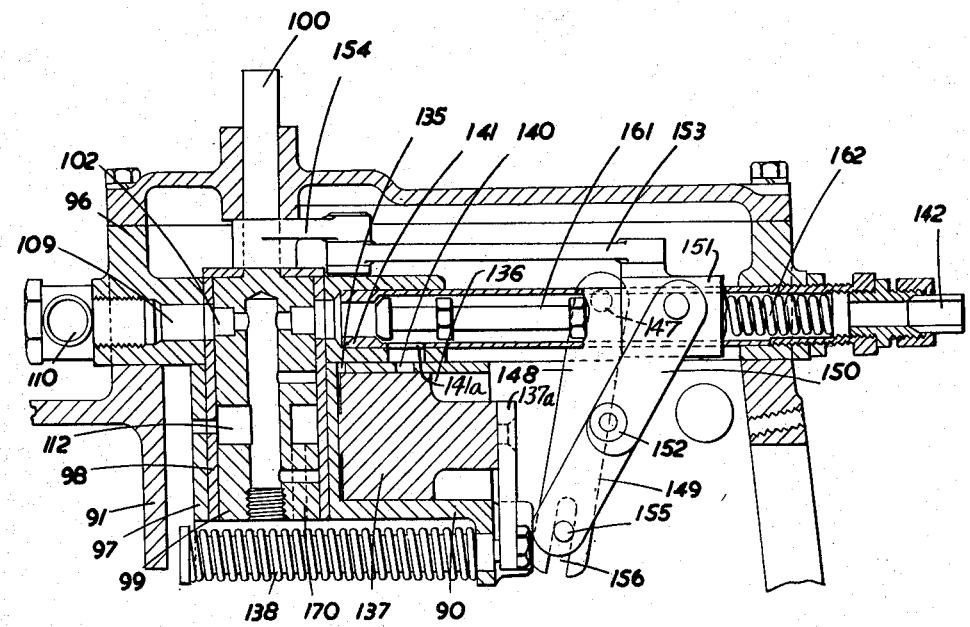
Figure 3 is a part vertical section on the line 3—3 of Figure 4.

The cylinder block 90 has a bore 97 (see particularly Figures 1, 2 and 3) in which is located a liner 98 containing a rotary valve 99 having its upper end 100 connected by any usual means to a ship's telegraph lever. The rotary valve (see particularly Figures 3 and 10 to 13) has radial ports 102 whereby fluid pressure is introduced into a central bore 103. This fluid pressure is supplied (see Figure 1) by a pump 104 driven by a shaft 105 that passes completely through the output shaft and is connected by a hexagonal end 106 to a block 107 which is attached by rivets 108 to the driven plate 20. The pump supplies the oil under pressure to a chamber 109 (see Figure 3) through a nozzle 110 from which it reaches the radial ports 102 through an opening in the liner. The rotary valve has an outlet port 112 adapted to be moved into a position in which outlet therefrom is blocked by the liner 98 or into a position in which outlet therefrom reaches the cylinder 89 through a drilling 113b and an opening 113 (see Figures 7 and 9) (as shown by arrow 113a in Figure 6) for clutch engagement or to an astern position where outlet from the port 112 passes through a drilling 114b and an opening 114 (see Figure 9) to a cylinder 115 in the cylinder block 90 for engaging the brake. The rotary valve 99 has additional ports 112a for providing a balancing pressure on the rotary valve. The expanding brake elements are operated by usual means 116 (Figure 15) through a rod 117 connected to a pin 118 carried by a pair of spaced arms one of which is shown at 119, the upper ends of which bear on a plate 121, carried slidably by a piston rod 122 and pressed by springs 123. This piston rod carries a piston 124 having a recess 125 connected by ports 126 to the interior of the piston and having a projection 128 whereby a space 129 is left between the piston and the end of the cylinder for introduction of oil under pressure from the opening 114. The piston rod 122 is extended to connect at 130 with an arm 131 pivoted at 132 on a pivot pin which also carries arms 119. This arrangement by compression of the spring 123 enables the piston 124 to move beyond the brake engaged position until the head of the piston moves beyond a slot 135 cut in the cylinder block 90 whereupon the oil under pressure passes through this slot into a cylinder 136 which we term an interlock cylinder. This oil pressure operates a piston 137 against the action of a spring 138 which spring acts on the piston through an arm 137a carried by the piston. The piston 137 and cylinder 90 are shown of slightly modified design in Figures 1 and 3 the essential difference being that the piston 137 in Figure 1 is hollow whereas in Figure 3 it is solid but the operation is the same. When this piston 137 is moved far enough to the right (Figure 1) it uncovers a port 140 whereupon the oil escapes into a tube 141 through the slots 141a and passes through a pipe 142 into an axial bore in the shaft 53 and passing through appropriate oil holes such as 144, serves to lubricate the rotary parts of the gearing. The movement of the piston 137 to the right (Figure 1) is utilised to produce a condition in which the engine throttle can be operated. A lever 146 (see Figure 4) is connected to the engine throttle and is carried by a spindle 147 to which is attached one end of a lever 148 (see Figures 1 and 4) the other end of which is connected to an arm 149 adjacent to which is another arm 150, these two arms being connected to a trunnion block 151 (see Figures 1 and 4) and being connected together by a cross-piece 152. The block 151 is slidably mounted on the tube 141 and is connected by a rod 153 and arm 154 to the spindle 100 of the control valve. The connection between the lever 148 and arm 149 is by way of a pin 155 carried by the arm 149 and engaging in a slot 156 in the lever.

The slot 135 in the cylinder block 90 extends also into the cylinder 89 so that this slot is uncovered by the piston 88 when this is moved to apply the clutch and oil under pressure likewise reaches the cylinder 136 from the cylinder 89.

Thus upon introduction of oil to the pistons 124 or 88 the brake or clutch must first be applied before oil pressure through 135 and 136 can operate the piston 137 to permit opening of the throttle of the engine. The outlet port 140 is in the form of two slots one communicating with the tube 141 and the other communicating with the cylinder 89.

The tube 141 contains a relief valve 161 normally closed by a spring 162 whereby fluid from the chamber 109 can be by-passed to the lubricating pipe 142.

The rotary valve 99 has exhaust holes 170 and the liner 98 has ports 171, 172. When the pressure port 112 is delivering oil through 171, 114 to the brake cylinder 115, the space 93 of the clutch cylinder 89 is connected through 113, 172, 170 to exhaust. Similarly, when the pressure port 112 is delivering oil through 172 and 113 to the clutch cylinder 89, the space 129 of the brake cylinder 115 is connected to exhaust through 114, 171, 170.

If the valve is open to, say, the ahead cylinder, the brake remains stationary in the "off" position, but the ahead clutch is engaged. In the event of a sudden swing from say, ahead to astern, the pressure in the clutch cylinder is relieved, thereby allowing the clutch to be instantaneously withdrawn, and pressure is applied to the brake cylinder which creates an appropriate load on the expanding shoes of the brake assembly.

The discharged oil from the interlock cylinder is lead in astern to the relieved side of the pressure relief valve through the part 140, which is in communication with the end of the main driving shaft of the gear box, the lubricant being transferred to the internal bevel gears and their attendant bearings through a passage drilled along the centre of the shaft. Some of this discharged oil can if necessary escape through the openings 125, 126, to the interior of the piston 124. When in "ahead" this lubrication is undesirable, so the discharge oil from the interlock cylinder is mainly directed through the part 140 and hole 95 in the skirt of the ahead piston which oil drains on to the main reduction gearing for its lubrication.

It will be seen that the throttle interlock piston remains within its cylinder until it is propelled backwards by the oil escaping from either the ahead or astern cylinders 89, 124 when either piston has reached the end of its travel. As the trunnion block 151 on the relief valve sleeve 141 moves forward under the influence of the telegraph lever, it draws the vertically disposed interlocking arm 149 with it on the lower extremity of which is the pin 155 engaging the slot 156 on the lever 148. It will be appreciated that when the interlocking piston is in the "in" position, no movement takes place on the lower extremity of the throttle link even when the trunnion is in the fully open position (i. e. forward), but so soon as the interlock piston moves rearwards the arm 137a thereon engages the cross-piece 152 and thereafter movement of the trunnion block 151 moves the lever 150 about a pivotal centre constituted by the contact point of the cross-piece 152 on the arm 137a so that the lower extremity of the arm 149 is then operated about that centre carrying with it the throttle lever 148. This action which transforms an idle pin 152 on the throttle interlocking lever into a fulcrum pin, thus affords an infinitely variable degree of throttle opening and is a complete safeguard against damage which might be caused by engaging a clutch with a wide open engine throttle.

When the telegraph is moved to "slow ahead" the clutch is first engaged and then the interlock piston 137 is moved up to the pin 152 but this does not move the throttle lever to open the throttle. Any further movement of the telegraph towards full ahead position then causes the throttle lever 148, 146, to be moved correspondingly through the parts 154, 153, by pivoting of the lever 149 on the contact point of the pin 152 with the arm 137a and its pin 155 pulling back the lower end of the throttle lever. The same action occurs for "astern." The parts 154, 153, move over their dead centre positions at "neutral" so that no appreciable movement of the parts 151, 149, occurs between "slow ahead" and "slow astern" positions.

The output shaft 53 is connected on a final output shaft 180 through gear wheels 181, 182. The openings 113, 114 may be formed by milling a slot in the cylinder block 90 in the appropriate face thereof at right angles to the slot 135 which is in an adjacent face of the block.

I claim:

1. A power transmission apparatus having gearing providing reverse drive, a brake for holding an element of the gearing stationary to enable reverse drive to be effected, friction clutch means engagement of which provides direct forward drive, a brake control cylinder, a brake control piston in said cylinder, means for operatively connecting said brake control piston to said brake, a clutch control cylinder, a clutch control piston in said cylinder, means for operatively connecting the clutch control piston to said friction clutch, means for supplying fluid under pressure to the brake cylinder when brake engagement is required and to the clutch cylinder when clutch engagement is required, a throttle operating element, a control member for controlling actuation of said element, fluid pressure operated means for operating said control member, fluid pressure conduits connecting both said cylinders to said fluid pressure operated means, said conduits being positioned to open to said cylinders after the engaging strokes of the said pistons so that the fluid passes from the cylinders after engagement and reaches and operates the said fluid pressure operated means.

2. An apparatus as claimed in claim 1 wherein the fluid pressure operated means comprises a piston and cylinder connected by said porting to both of the said brake control and clutch control cylinders.

3. An apparatus as claimed in claim 1 wherein said fluid pressure operated means includes a rotary valve having pressure and exhaust ports which communicate with the said brake control and clutch control cylinders respectively in one position of the valve and which communicate with said cylinders in a reverse manner in another position of the valve.

4. Apparatus as claimed in claim 1 wherein said fluid pressure operated means includes a rotary valve controlling supply of fluid under pressure to said brake control and clutch control cylinders, a throttle operating arm constituting said control member, a throttle operating lever, a pin and slot connection between said arm and lever at adjacent ends thereof, connections between the other end of the arm and the valve and a fixed pivot carrying said lever at some distance from its slotted end, said fluid pressure operated means in its operative position constituting a pivotal point for said lever enabling the arm to actuate the lever and in its inoperative position being spaced from the lever so that movements of the arm are then not transmitted to the lever.

5. A power transmission apparatus having gearing providing reverse drive, a brake for holding an element of the gearing stationary to enable reverse drive to be effected, friction clutch means engagement of which provides direct forward drive, a brake control cylinder, a brake control piston in said cylinder and connected to the brake, a clutch control cylinder, a clutch control piston in said cylinder, the said cylinders being located in a common cylinder block, means for supplying fluid under pressure to the brake cylinder when brake engagement is required and to the clutch control cylinder when clutch engagement is required, a throttle operating element, a control member for controlling actuation of said element, fluid pressure operated means for operating said control member, fluid pressure conduits connecting both of said cylinders to said fluid pressure operated means, said conduits being positioned to open to said cylinders after the engaging strokes of the pistons so that fluid passes from the said cylinders after engagement and reaches and operates the said fluid pressure operated means.

6. A power transmission apparatus as claimed in claim 5 wherein said fluid pressure operating means includes a piston and cylinder, and said porting provides communication between this cylinder and said brake control cylinder and said clutch control cylinder.

7. A power transmission apparatus as claimed in claim 5 wherein said conduits consist on a single slot in the said common cylinder block.

8. A power transmission apparatus as claimed in claim 5 wherein slotting in the block provides exhaust communication between the brake and clutch control cylinders and said fluid pressure operated means.

9. A power transmission apparatus as claimed in claim 5 having a spring device between the brake control piston and the brake, whereby the piston can move beyond a brake engagement position for uncovering said conduits.

10. A power transmission apparatus comprising, gearing providing reverse drive, a brake for holding an element of the gearing stationary to enable reverse drive to be effected, clutch means engagement of which provides forward drive, a cylinder block having a brake control cylinder, a brake control piston in said cylinder and connected to the brake, a clutch control cylinder, a clutch control piston in said cylinder, and a rotary valve, located therein, a throttle operating element, a control member for controlling actuation of said element, an interlock cylinder in said block and forming part of fluid pressure operated means for operating said control member, and fluid pressure conduits in said block to connect all three cylinders and additional fluid pressure conduits to connect the said brake control and clutch control cylinders with the rotary valve.

11. A power transmission apparatus as claimed in claim 10, wherein the said brake and clutch control cylinders are contained within the said block on two parallel axes and the cylinder forming part of the fluid pressure operated means is parallel with said axes, and wherein said rotary valve has its axis at right angles to and located between said two parallel axes.

12. A control for a marine power transmission apparatus, comprising a throttle control lever, an arm, means operatively connecting said arm to said lever, movable means providing a pivotal point for said arm, means for moving said movable means into a position in which it serves as such pivotal point whereby the arm can move about the pivot to operate the throttle control lever and into a retracted position in which it cannot serve as a pivotal point and movements of the link are in consequence not imparted to the throttle control lever.

13. A power transmission apparatus having gearing providing forward and reverse drive, two sets of friction engaging devices the first for enabling forward drive to be effected and the second for enabling reverse drive to be effected, a first control cylinder, a first control piston in said cylinder, means for operatively connecting said first control piston to said first friction engaging means, a second control cylinder, a second control piston in said cylinder, means for operatively connecting the second control piston to said second friction engaging means, means for supplying fluid under pressure to the first cylinder when engagement of the first friction engaging means is required and to the second cylinder when engagement of the second friction engaging means is required, a throttle operating element, a control member for controlling actuation of said element, fluid pressure operated means for operating said control member, fluid pressure conduits connecting both said cylinders to said fluid pressure operated means, said conduits being positioned to open to said cylinders after the engaging strokes of the said pistons so that the fluid passes from the cylinders after engagement and reaches and operates the said fluid pressure operated means.

14. In a power transmission apparatus having a control member for engaging transmission elements, and a throttle actuating member, the provision of an hydraulic control device comprising a piston and cylinder one of which is movable and connected to the control member, a subsidiary piston and cylinder one of which is movable and controls operation of the throttle actuating member, means for supplying fluid under pressure to the first mentioned piston and cylinder, and means whereby the position of the movable member of said first mentioned piston and cylinder controls the entry of fluid under pressure to that end of the said second mentioned cylinder that causes movement of the throttle actuating member in the throttle opening direction, said means including a fluid pressure conduit positioned beyond the fully operative stroke of the first mentioned piston and cylinder and connecting the two cylinders whereby the same fluid that operates the first piston and cylinder also subsequently operates the second piston and cylinder after engagement of said elements.

JOHN HERBERT MATHERS.

REFERENCES CITED

The following references are of record in the file of this patent:

UNITED STATES PATENTS

| Number | Name | Date |
| --- | --- | --- |
| 1,979,488 | Perez | Nov. 6, 1934 |
| 2,380,677 | Schjolin | July 31, 1945 |
| 2,396,231 | Brill | Mar. 12, 1946 |
| 2,413,390 | Stevens | Dec. 31, 1946 |
| 2,413,675 | Baker | Jan. 7, 1947 |
| 2,488,756 | Baker | Nov. 22, 1949 |